United States Patent
Chang et al.

(10) Patent No.: US 8,220,979 B2
(45) Date of Patent: Jul. 17, 2012

(54) LIGHT GUIDE PLATE AND BACKLIGHT MODULE

(75) Inventors: Liang-Kang Chang, Hsinchu County (TW); Yu-Chuan Wen, Hsinchu County (TW)

(73) Assignee: Young Lighting Technology Inc., Hsin-Chu (TW)

( * ) Notice: Subject to any disclaimer, the term of this patent is extended or adjusted under 35 U.S.C. 154(b) by 433 days.

(21) Appl. No.: 12/572,926

(22) Filed: Oct. 2, 2009

(65) Prior Publication Data
US 2010/0097823 A1 Apr. 22, 2010

(30) Foreign Application Priority Data
Oct. 22, 2008 (TW) .............................. 97140385 A (51) Int. Cl.
*F21V 7/04* (2006.01)
(52) U.S. Cl. .................. 362/610; 362/619; 362/628
(58) Field of Classification Search ......... 362/606–610, 362/612, 613, 615–620, 628, 632–634; 385/129, 385/130, 146, 901
See application file for complete search history.

(56) References Cited

U.S. PATENT DOCUMENTS

| | | | | |
|---|---|---|---|---|
| 6,361,180 | B1 * | 3/2002 | Iimura | 362/616 |
| 6,608,961 | B2 * | 8/2003 | Travis | 385/146 |
| 6,951,401 | B2 * | 10/2005 | Van Hees et al. | 362/612 |
| 7,033,034 | B2 | 4/2006 | Oh | |
| 7,237,939 | B2 | 7/2007 | Kim et al. | |
| 7,239,792 | B2 | 7/2007 | Kim | |

FOREIGN PATENT DOCUMENTS

| TW | I261138 | 3/2004 |
|---|---|---|
| TW | I259312 | 10/2004 |
| TW | M272110 | 12/2004 |
| TW | I275876 | 10/2005 |

* cited by examiner

*Primary Examiner* — Thomas Sember
(74) *Attorney, Agent, or Firm* — Muncy, Geissler, Olds & Lowe, PLLC (57) ABSTRACT

A light guide plate includes a plate-shaped transparent body and a plurality of stripe-shaped planar structures. The plate-shaped transparent body is bent to form a top portion, a bottom portion, and a curved portion connected between the top portion and the bottom portion, and the top portion and the bottom portion are substantially parallel to each other and define a gap therebetween. The stripe-shaped planar structures are connected with each other on an outer surface of the curved portion.

18 Claims, 9 Drawing Sheets

LIGHT GUIDE PLATE AND BACKLIGHT MODULE

CROSS REFERENCE TO RELATED APPLICATION

This application claims priority of application No. 097140385 filed on Oct. 22, 2008 in Taiwan R.O.C under 35 U.S.C. §119; the entire contents of which are hereby incorporated by reference.

BACKGROUND OF THE INVENTION

1. Field of the Invention

The invention relates to a light guide plate and a backlight module having double-sided light emissions.

2. Description of the Related Art

Figure 1:
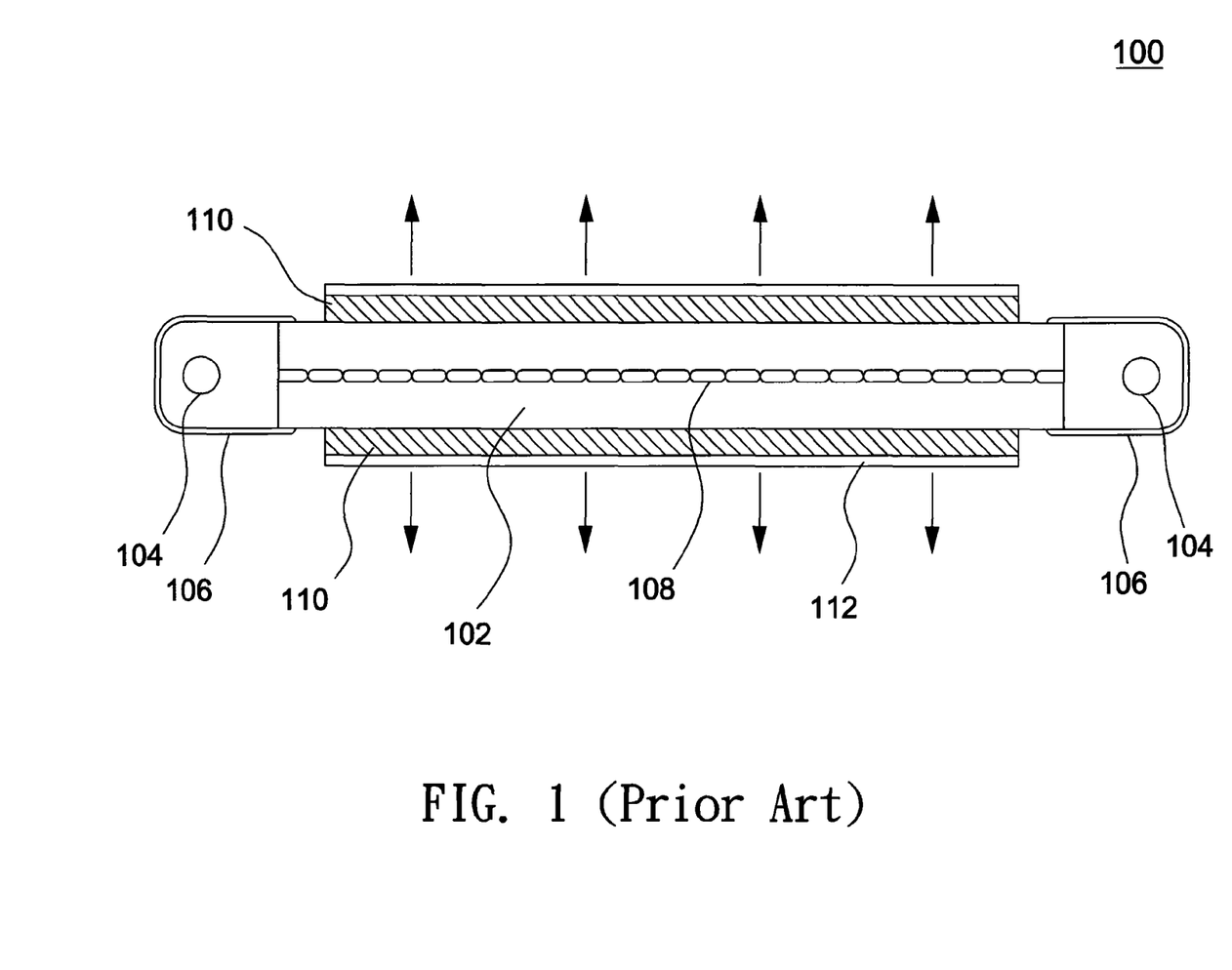
FIG. 1 shows a schematic diagram of a conventional double-sided backlight module.

FIG. 1 shows a schematic diagram of a conventional double-sided backlight module 100. Referring to FIG. 1, the double-sided backlight module 100 includes a light guide plate 102, two cold cathode fluorescent lamps 104, two lamp reflectors 106, and an aperture pattern 108. The emitting light beams of each cold cathode fluorescent lamp 104 are reflected by the lamp reflector 106 and then enter the light guide plate 102. After that, the light beams are guided to diffusion plates 110 on two sides of the light guide plate 102 through the aperture pattern 108 and directed toward an on-axis viewing direction (normal direction) of the light guide plate 102.

Though two-sided light emissions are obtained in the conventional design, the mutual influence between the light emissions of either side of the light guide plate 102 exists; that is, the emitting light beam of one side may affect the screen display on the other side of the light guide plate 102. Also, the double-sided light emissions are liable to cause the leakage of light on the light guide plate 102.

BRIEF SUMMARY OF THE INVENTION

The invention provides a light guide plate and a backlight module having double-sided light emissions.

According to an embodiment of the invention, a light guide plate capable of transmitting light beam includes a plate-shaped transparent body and a plurality of stripe-shaped planar structures. The plate-shaped transparent body is bent to form a top portion, a bottom portion and a curved portion connected between the top portion and the bottom portion, and the top portion and the bottom portion are substantially parallel to each other and define a gap therebetween. A plurality of the stripe-shaped planar structures are connected with each other on an outer surface of the curved portion.

In one embodiment, an included angle θr between an $r_{th}$ stripe-shaped planar structure counted from the central plane and the central plane satisfies the following equation:

$$\theta r = 90° \ast [n-(r_{th}-1)]/n$$

, where n denotes the number of the stripe-shaped planar structures between the central plane and a periphery of the outer surface of the curved portion.

In one embodiment, the curved portion is divided by the central plane into a first half of the curved portion and a second half of the curved portion, and the number of the stripe-shaped planar structures in the first half of the curved portion is different to the number of the stripe-shaped planar structures in the second half of the curved portion.

In one embodiment, a plurality of first micro structures are formed on a first side surface of the top portion opposite the bottom portion for guiding the light beam out of the plate-shaped transparent body through the first side surface, and a plurality of second micro structures are formed on a second side surface of the bottom portion opposite the top portion for guiding the light beam out of the plate-shaped transparent body through the second side surface. A plurality of third micro structures are formed on a third side surface of the top portion facing towards the double-sided reflective sheet, and a plurality of fourth micro structures are formed on a fourth side surface of the bottom portion facing towards the double-sided reflective sheet. In that case, the distribution of light energy on the first side surface and the second side surface may be adjusted to a greater extent, and the light beams deflected to travel in an on-axis viewing direction are considerably increased.

According to another embodiment of the invention, a backlight module includes a plate-shaped transparent body, a light source, a reflective cover, a double-sided reflective sheet, and a plurality of stripe-shaped planar structures. The plate-shaped transparent body is bent to form a top portion, a bottom portion and a curved portion connected between the top portion and the bottom portion, the top portion and the bottom portion are substantially parallel to each other and define a gap therebetween. The light source is disposed adjacent to one side of the plate-shaped transparent body for emitting light beam. The reflective cover is disposed adjacent to the outer surface of the curved portion to reflect the light beam leaving the curved portion back to the plate-shaped transparent body. The double-sided reflective sheet is disposed in the gap formed between the top portion and the bottom portion. A plurality of the stripe-shaped planar structures are connected with each other on an outer surface of the curved portion.

In one embodiment, a first side surface and a second side surface of the plate-shaped transparent body are substantially parallel to the double-sided reflective sheet.

In one embodiment, the light source has a light-emitting surface and the light-emitting surface overlaps an end surface of the top portion, an end surface of the bottom portion, or both of them. The thickness of the top portion is kept fixed or gradually decreased in a direction away from the curved portion. Also, the thickness of the bottom portion is kept fixed, gradually increased in a direction opposite the curved portion, gradually decreased in a direction away from the curved portion, or gradually decreased and then increased in a direction away from the curved portion.

According to the above embodiments, since a light guide plate is made of a plate-shaped transparent body, the plate-shaped transparent body is bent to form a top portion and a bottom portion, and the top portion and the bottom portion have their respective regions for spreading micro structures, the distribution of light energy on the first side surface and the second side surface may be easily adjusted. Further, since the light emissions from the first side surface and the second side surface are separated from each other by the double-sided reflective sheet, the light emissions from one side surface do not exert an influence over the light emissions of the other side surface, and the leakage of light is also eliminated. Further, since the light guide plate is bent to form multiple light-emitting surfaces, such fabrication process is simple and the fabrication cost is considerably reduced as a result.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 2:
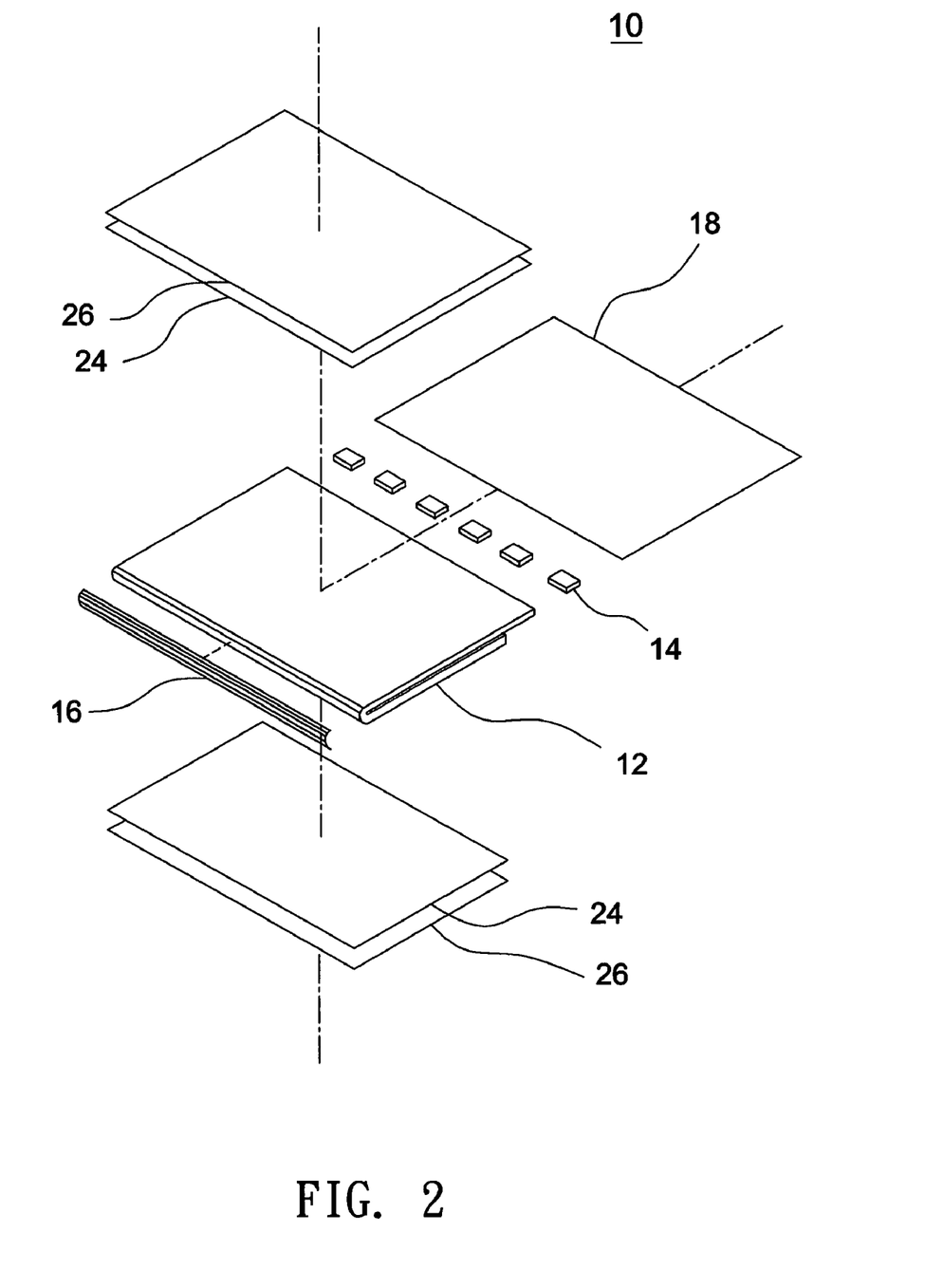
FIG. 2 shows an exploded view of a backlight module according to an embodiment of the invention.
Figure 3:
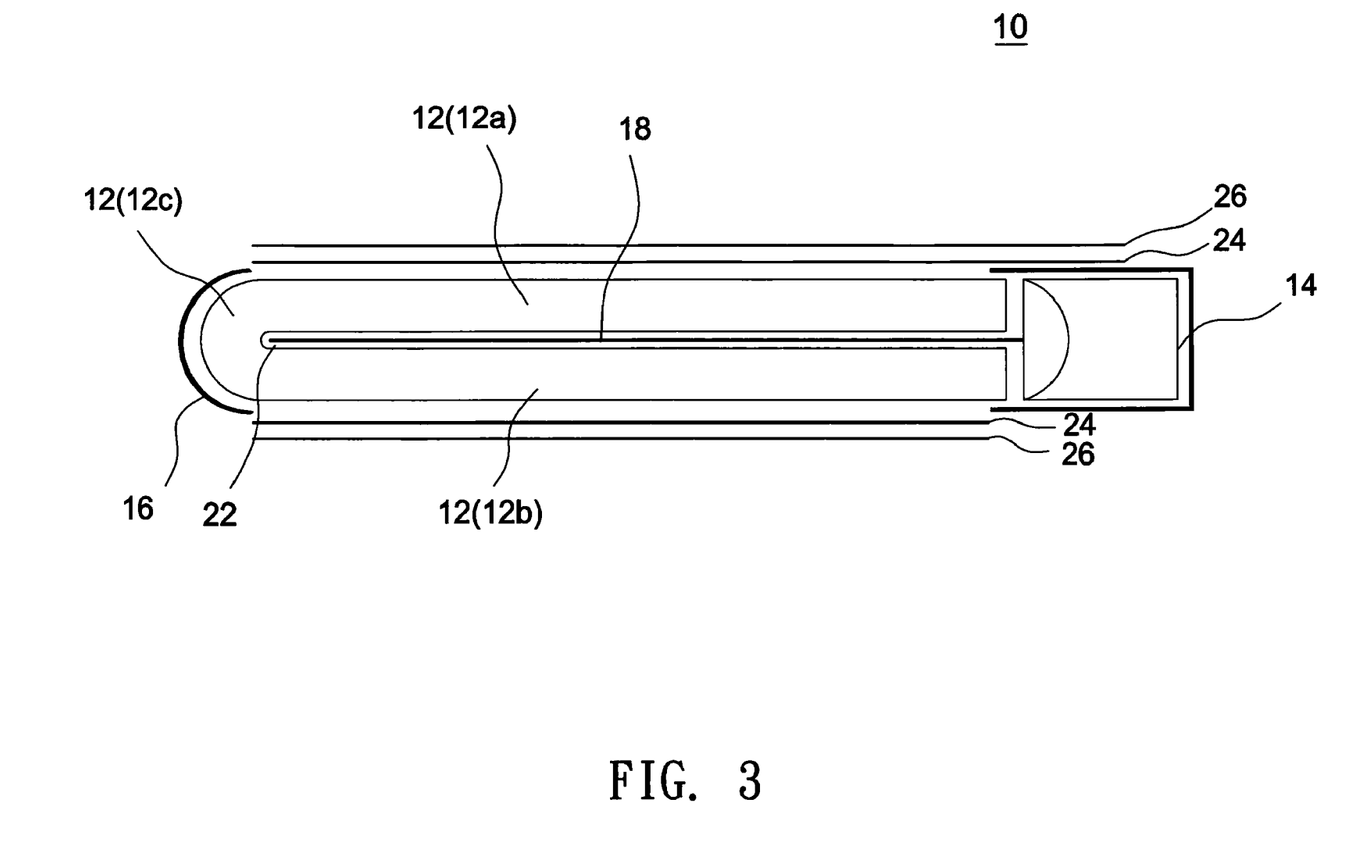
FIG. 3 shows a cross-section of an assembled backlight module.

FIG. 2 shows an exploded view of a backlight module 10 according to an embodiment of the invention, and FIG. 3 shows a cross-section of an assembled backlight module 10. Referring to both FIG. 2 and FIG. 3, the backlight module 10 includes a plate-shaped transparent body 12, at least one light source 14 (illustrated as multiple LEDs), a reflective cover 16, and a double-sided reflective sheet 18. The plate-shaped transparent body 12 is bent to form a top portion 12a, a bottom portion 12b, and a curved portion 12c connected between the top portion 12a and the bottom portion 12b. The top portion 12a and the bottom portion 12b are substantially parallel to each other and define a gap 22 therebetween, and the double-sided reflective sheet 18 is disposed in the gap 22. The light source 14 is disposed adjacent to one side of the plate-shaped transparent body 12 for emitting light beams. The reflective cover 16 is disposed adjacent to an outer surface of the curved portion 12c. The reflective cover 16 is capable of reflecting the light beams leaving the plate-shaped transparent body 12 by the curved portion 12c back to the plate-shaped transparent body 12. Further, several optical sheets may be put over and under the plate-shaped transparent body 12 to improve the optical characteristics of the backlight module 10. For example, the optical sheets may include a diffusion plate 24, a brightness enhancement film 26, etc.

Figure 4A:
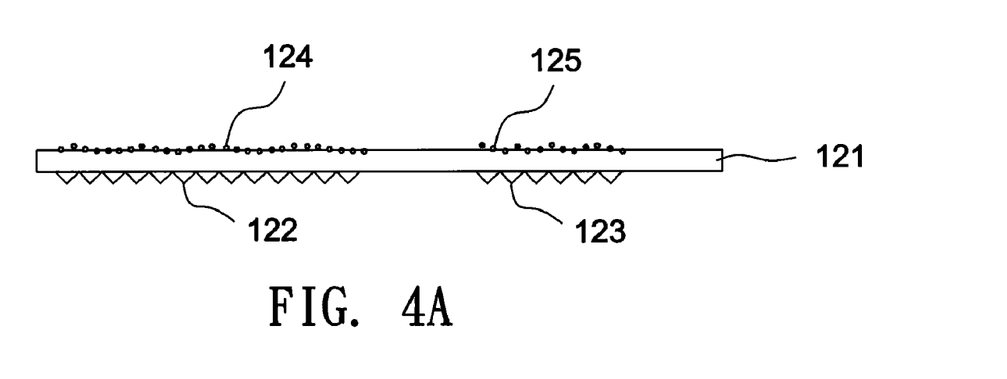
FIGS. 4A to 4C show schematic diagrams illustrating a fabrication embodiment of the plate-shaped transparent body.
Figure 4B:
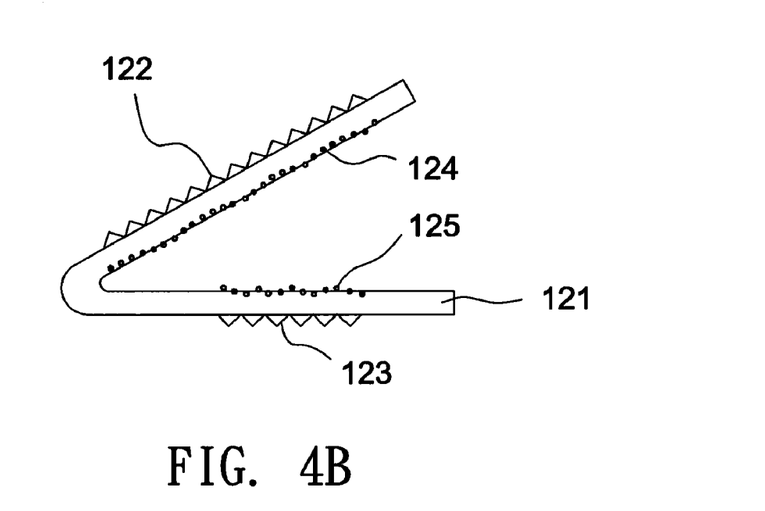
Figure 4C:
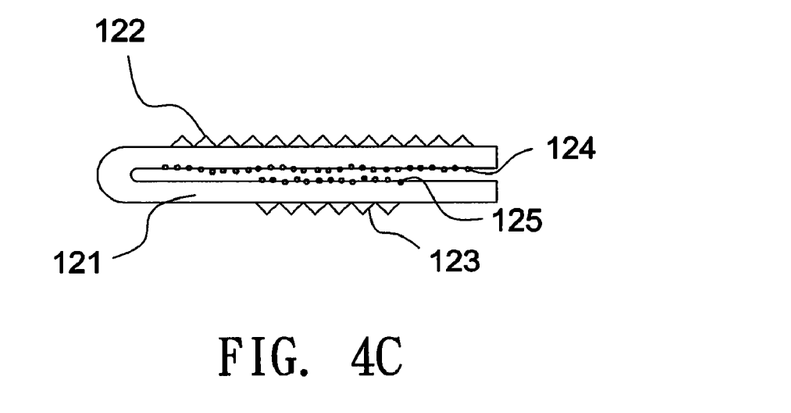

FIGS. 4A to 4C show schematic diagrams illustrating a fabrication embodiment of the plate-shaped transparent body 12. Referring to FIG. 4A, first micro structures 122 and second micro structures 123 are respectively formed on two separate regions of a bottom surface of an injection-molded transparent plate 121. Also, third micro structures 124 and fourth micro structures 125 are respectively formed on two separate regions of a top surface of the transparent plate 121. Then, as shown in FIG. 4B, the transparent plate 121 is subject to heat treatment and bent to form a curved portion on which no micro structures are formed. When the transparent plate 121 is bent to the extent that two substantially parallel portions of the transparent plate 121 are formed as shown in FIG. 4C, it is subject to cold processing to shape the transparent plate 121 to conform to a typical manufacture specification of a light guide plate.

Figure 5:
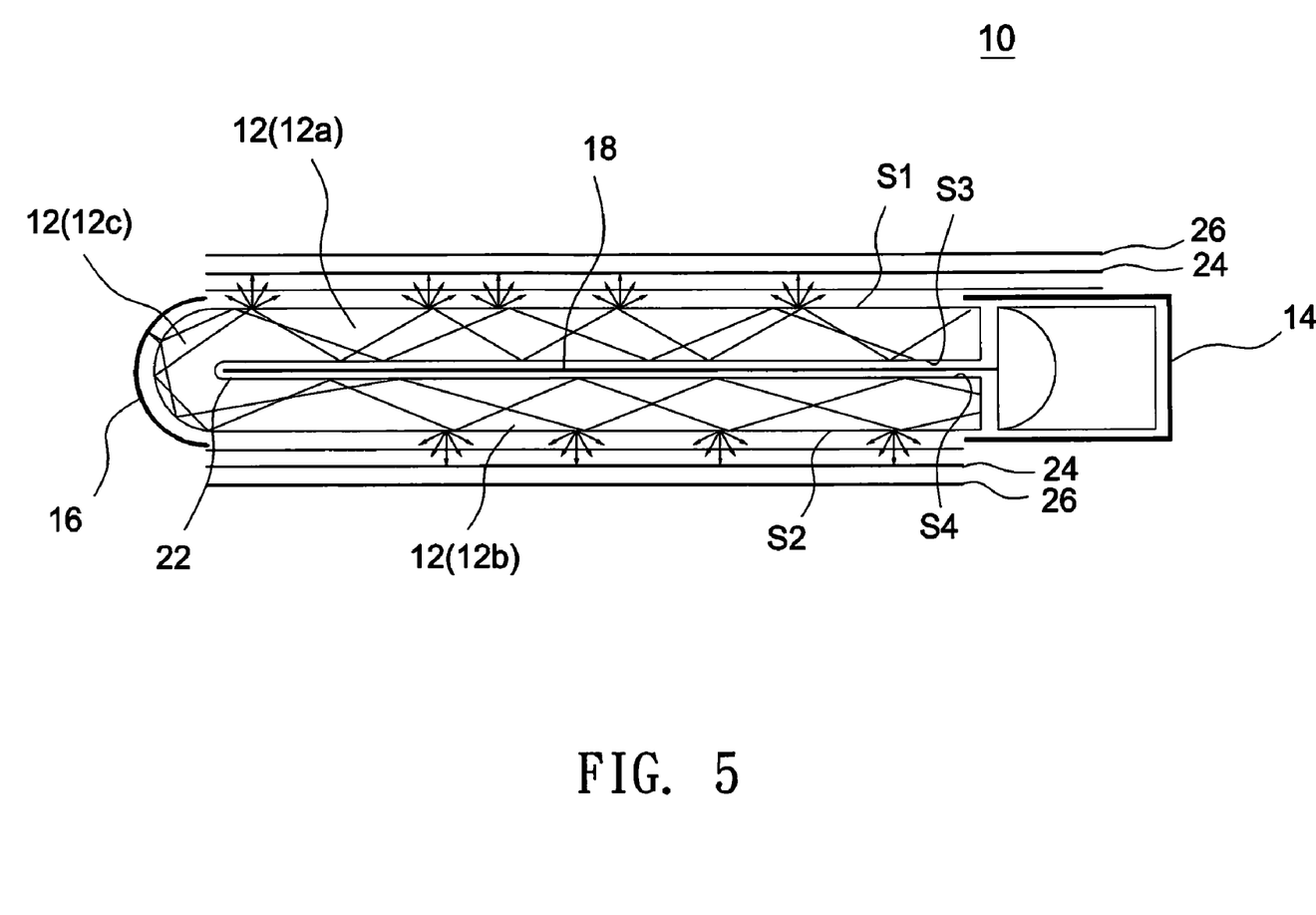
FIG. 5 shows a cross section of a backlight module for illustrating the propagation paths of light beams in the backlight module.

FIG. 5 shows a cross section of a backlight module 10 for illustrating the propagation paths of light beams in the backlight module 10. Referring to FIG. 5, after the emitting light beams of the light source 14 enter the bent plate-shaped transparent body 12, they are totally reflected inside the plate-shaped transparent body 12 following the Snell's law. When light beams encounter the first micro structures (not shown) on a first side surface S1 of the top portion 12a opposite the double-sided reflective sheet 18, a part of light beams are deflected by the first micro structures to travel to the curved portion 12c and then enter the bottom portion 12b, and a part of light beam are guided out of the transparent body 12 via the first side surface S1 since the first micro structures are allowed to change the propagation paths of light beams to eliminate total reflection. In comparison, when light beams encounter the second micro structures (not shown) on a second side surface S2 of the bottom portion 12b opposite the double-sided reflective sheet 18, a part of light beams are deflected by the second micro structures to travel to the curved portion 12c and then enter the top portion 12a, and a part of light beams are guided out of the transparent body 12 via the second side surface S2 since the second micro structures are allowed to change the propagation paths of light beams to eliminate total reflection. The double-sided reflective sheet 18 in the gap 22 is substantially parallel to the first side surface S1 and the second side surface S2 to reflect light beams emitted from the top portion 12a and the bottom portion 12b back to the plate-shaped transparent body 12. Also, the reflective cover 16 disposed adjacent to the curved portion 12c is allowed to reflect the light beams leaving the curved portion 12c back to the plate-shaped transparent body 12. Note the reflective cover 16 is not limited to a specific shape.

In one embodiment, the shape of the reflective cover 16 may correspond to the profile of the curved portion 12c to increase the amount of light beams back to the plate-shaped transparent body 12.

According to the above embodiments, since a light guide plate is made of a plate-shaped transparent body 12 that is bent to form a top portion 12a and a bottom portion 12b, and the top portion 12a and the bottom portion 12b have their respective regions for spreading micro structures, the distribution of light energy on the first side surface S1 and the second side surface S2 may be easily adjusted. Further, since the light emissions from the first side surface S1 and the second side surface S2 are separated from each other by the double-sided reflective sheet 18, the light emissions from one side surface do not exert an influence over the light emissions of the other side surface, and the leakage of light is also eliminated. Particularly, when the area of the first side surface is different to that of the second side surface (such as a main screen and a back auxiliary screen in a mobile phone), the double-sided reflective sheet 18 is allowed to prevent the leakage of light of the auxiliary screen from affecting the image display of the main screen. Further, since the light guide plate is bent to form multiple light-emitting surfaces, such fabrication process is simple and the fabrication cost is considerably reduced as a result.

Please refer to both FIG. 4C and FIG. 5, though not necessary, in one embodiment multiple third micro structures 124 are formed on a third side surface S3 of the top portion 12a facing towards the double-sided reflective sheet 18, and multiple fourth micro structures 125 are formed on a fourth side surface S4 of the bottom portion 12b facing towards the double-sided reflective sheet 18. In that case, the distribution of light energy on the first side surface S1 and the second side surface S2 may be adjusted to a greater extent, and the light beams deflected to travel in an on-axis viewing direction (normal direction) are considerably increased. Note the first, second, third and fourth micro structures are not limited to a specific shape and may be grooves or dots.

Figure 6A:
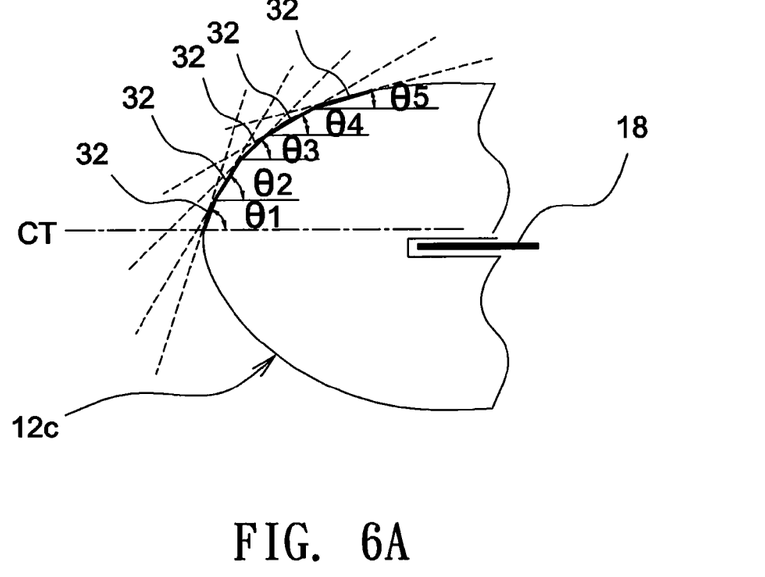
FIG. 6A and FIG. 6B are schematic diagrams illustrating a plate-shaped transparent body with high light-utilization efficiency according to an embodiment of the invention.
Figure 6B:
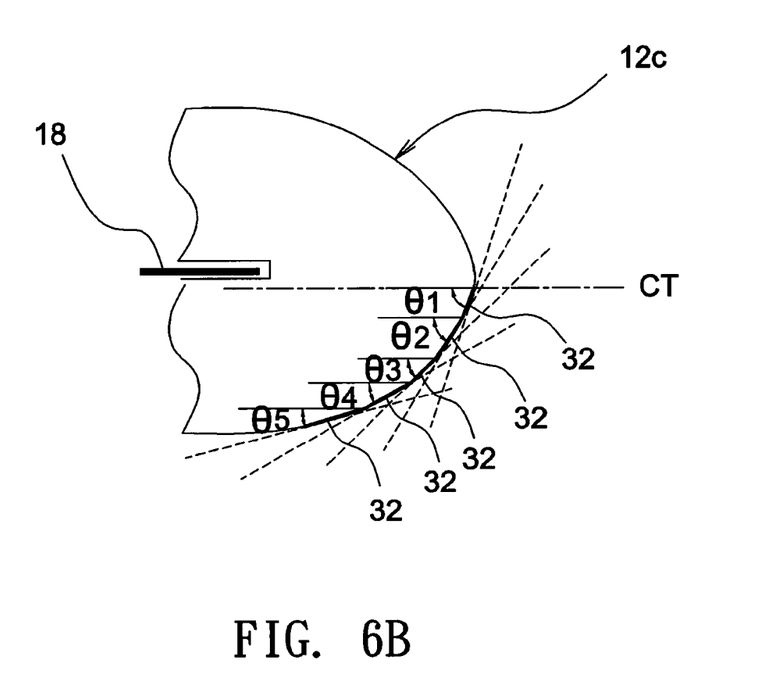

FIG. 6A and FIG. 6B are schematic diagrams illustrating a plate-shaped transparent body 12 with high light-utilization efficiency according to an embodiment of the invention. Referring to both FIG. 6A and FIG. 6B, multiple stripe-shaped planar structures 32 are connected with each other on an outer surface of the curved portion 12c, so the possibility that the light beams leave the transparent body 12 by the curved portion 12c is reduced, and the amount of light beams entering the top portion 12a or the bottom portion 12b via the curved portion 12c is increased. In this embodiment, the curved portion 12c of the transparent body 12 is divided by a central plane CT into an upper part and a lower part, and the stripe-shaped planar structures 32 are formed on the upper part (FIG. 6A) and the lower part (FIG. 6B) and form a plurality of angles θ1-θ5 with the central plane CT. Also, the values of angles θ1-θ5 in the upper part or in the lower part are gradually decreased from the central plane CT to a periphery of an outer surface of the curved portion 12c (θ1>θ2>θ3>θ4>θ5). In one embodiment, an included angle θr between an $r_{th}$ stripe-shaped planar structure 32 counted from the central plane CT and the central plane CT satisfies the following equation:

$$\theta r = 90°*[n-(r_{th}-1)]/n$$

Figure 6C:
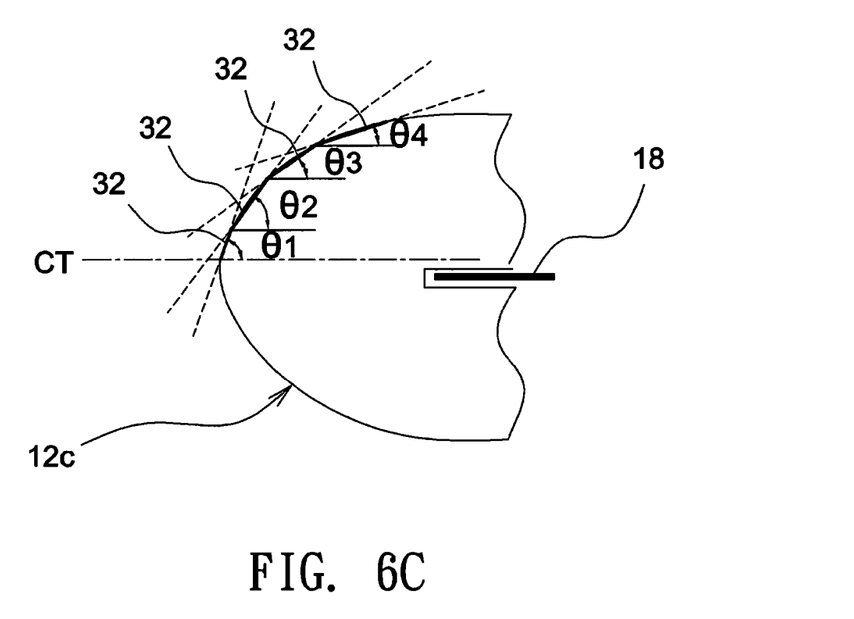
FIG. 6C and FIG. 6D are schematic diagrams illustrating a plate-shaped transparent body with high light-utilization efficiency according to another embodiment of the invention.
Figure 6D:
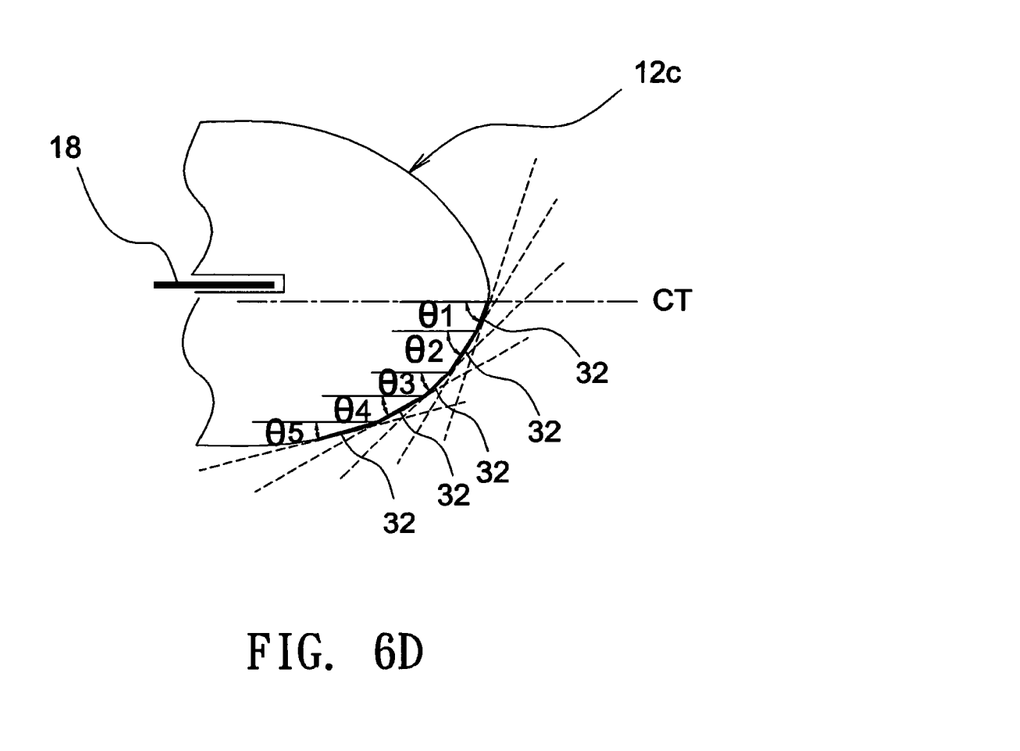

, where n denotes the number of the stripe-shaped planar structures 32 between the central plane CT and the periphery of the outer surface of the curved portion 12c. Thus, a prefer angle for each stripe-shaped planar structure 32 is obtained. For example, in case the number n=5, then θ1=90°, θ2=72°, θ3=54°, θ4=36° and θ5=18° are obtained. Further, though in the above embodiment the number of the stripe-shaped planar structures 32 in the upper part is equal to that in the lower part, this is not limited. For example, in one embodiment, the upper part of the curved portion 12c is provided with four stripe-shaped planar structures 32 as shown in FIG. 6C (θ1=90°, θ2=67.5°, θ3=45° and θ4=22.5°, and its lower part is provided with five stripe-shaped planar structures 32 as shown in FIG. 6D (θ1=90°, θ2=72°, θ3=54°, θ4=36° and θ5=18°.

Figure 7A:
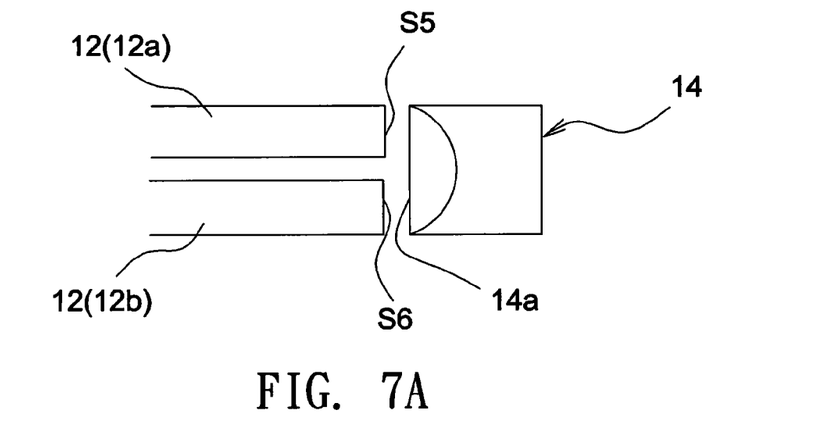
FIGS. 7A to 7C show schematic diagrams illustrating different arrangements of the plate-shaped transparent body in relation to a light source.
Figure 7B:
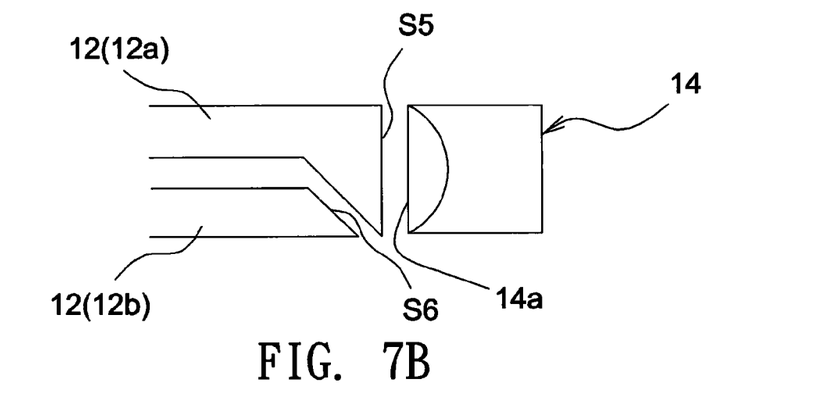
Figure 7C:
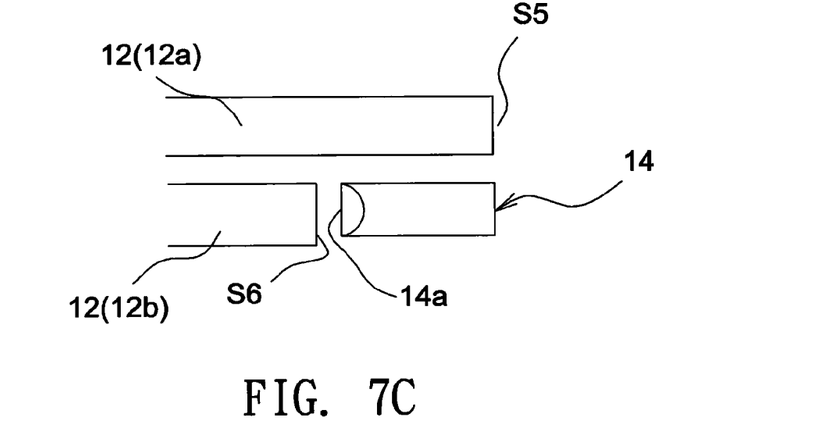
Figure 8A:
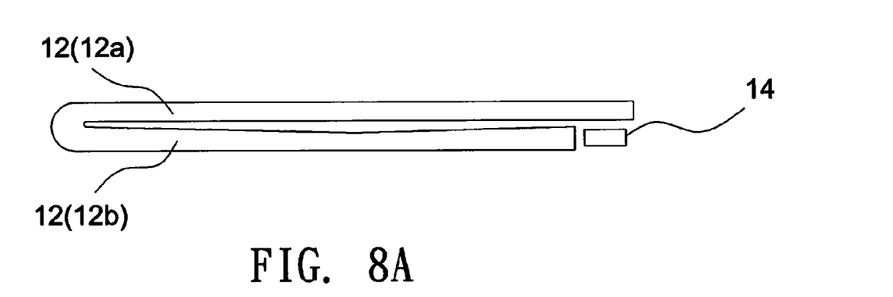
FIGS. 8A to 8D show schematic diagrams illustrating different shapes of the plate-shaped transparent body and different arrangements of the plate-shaped transparent body in relation to a light source.
Figure 8B:
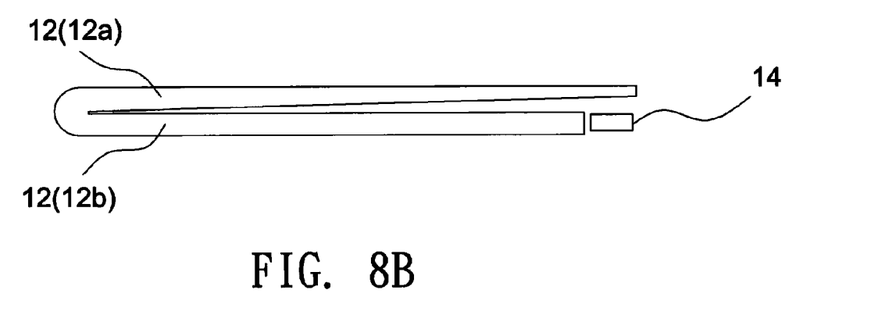
Figure 8C:
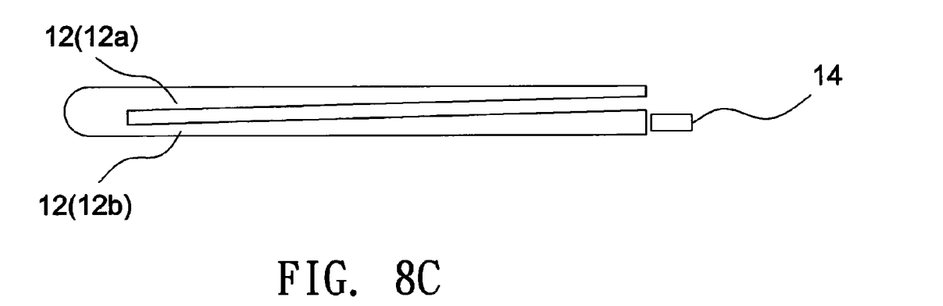
Figure 8D:
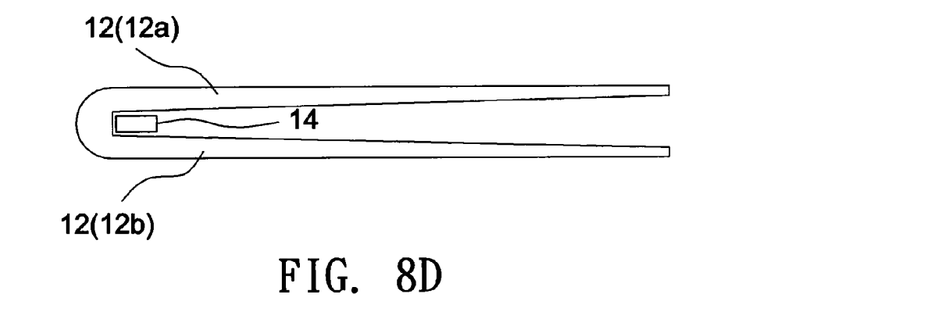

According to the above embodiments, a light-emitting surface 14a of the light source 14 may substantially overlap an end surface S5 of the top portion 12a (FIG. 7B), an end surface S6 of the bottom portion 12b (FIG. 7C), or both of them (FIG. 7A). Besides, the light source 14 may adjacent to one end of the bottom portion 12b (FIG. 8A) or adjacent to one end of the curved portion 12c (FIG. 8D). Further, the thickness of the top portion 12a may be kept fixed (FIG. 8A) or gradually decreased in a direction away from the curved portion 12c (FIG. 8B). Also, the thickness of the bottom portion 12b may be kept fixed (FIG. 8B), gradually increased in a direction opposite the curved portion 12c (FIG. 8C), gradually decreased in a direction away from the curved portion 12c (FIG. 8D), or gradually decreased and then increased in a direction away from the curved portion 12c (FIG. 8A). The top portion 12a and the bottom portion 12b may have identical sizes (FIG. 8C) or different sizes (FIG. 8A). In case of different sizes, the area of a first light-emitting surface (such as the first side surface S1) is different to that of a second light-emitting surface (such as the second side surface S2). Note the terms "top portion" and "bottom portion" used in the above embodiments are only exemplified to relate the drawings but not limit the invention.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light guide plate capable of transmitting a light beam, comprising:
   a plate-shaped transparent body bent to form a top portion, a bottom portion, and a curved portion connected between the top portion and the bottom portion, wherein the top portion and the bottom portion are substantially parallel to each other and define a gap therebetween; and
   a plurality of stripe-shaped planar structures connected with each other on an outer surface of the curved portion, wherein the stripe-shaped planar structures form a plurality of angles with a central plane of the curved portion, and the values of the angles are gradually decreased from the central plane to a periphery of the outer surface of the curved portion.

2. The light guide plate of claim 1, wherein the curved portion is divided by the central plane into a first half of the curved portion and a second half of the curved portion, and a number of the stripe-shaped planar structures in the first half of the curved portion is different to a number of the stripe-shaped planar structures in the second half of the curved portion.

3. The light guide plate of claim 1, wherein an included angle θr between an $r_{th}$ stripe-shaped planar structure counted from the central plane and the central plane satisfies the following equation:

$$\theta r = 90°*[n-(r_{th}-1)]/n$$

, where n denotes the number of the stripe-shaped planar structures between the central plane and the periphery of the outer surface of the curved portion.

4. The light guide plate of claim 1, further comprising:
   a plurality of first micro structures on a first side surface of the top portion opposite the bottom portion for guiding a light beam out of the plate-shaped transparent body through the first side surface; and
   a plurality of second micro structures on a second side surface of the bottom portion opposite the top portion for guiding a light beam out of the plate-shaped transparent body through the second side surface.

5. The light guide plate of claim 4, wherein each of the first micro structures and the second micro structures comprises a groove or a dot.

6. The light guide plate of claim 1, further comprising:
   a plurality of third micro structures on a third side surface of the top portion facing towards the bottom portion for guiding a light beam out of the plate-shaped transparent body through the third side surface; and
   a plurality of fourth micro structures on a fourth side surface of the bottom portion facing towards the top portion for guiding a light beam out of the plate-shaped transparent body through the fourth side surface.

7. The light guide plate of claim 6, wherein each of the third micro structures and the fourth micro structures comprises a groove or a dot.

8. The light guide plate of claim 1, wherein one end of the bottom portion is adjacent to at least one light source and a thickness of the bottom portion is gradually decreased and then increased in a direction away from the curved portion.

9. The light guide plate of claim 1, wherein one end of the bottom portion is adjacent to at least one light source and a thickness of the bottom portion is gradually decreased or increased in a direction away from the curved portion.

10. The light guide plate of claim 1, wherein one end of the bottom portion is adjacent to at least one light source and a thickness of the top portion is gradually decreased in a direction away from the curved portion.

11. A backlight module, comprising:
    a plate-shaped transparent body bent to form a top portion, a bottom portion, and a curved portion connected between the top portion and the bottom portion, wherein the top portion and the bottom portion are substantially parallel to each other and define a gap therebetween;
    a plurality of stripe-shaped planar structures connected with each other on an outer surface of the curved portion;
    a light source disposed adjacent to one side of the plate-shaped transparent body for emitting a light beam;
    a reflective cover disposed adjacent to the outer surface of the curved portion to reflect the light beam leaving the curved portion back to the plate-shaped transparent body; and
    a double-sided reflective sheet disposed in the gap formed between the top portion and the bottom portion.

12. The backlight module of claim 11, wherein the stripe-shaped planar structures form a plurality of angles with a central plane of the curved portion, and the values of the angles are gradually decreased from the central plane to a periphery of the outer surface of the curved portion.

13. The backlight module of claim 12, wherein the curved portion is divided by the central plane into a first half of the curved portion and a second half of the curved portion, and the number of the stripe-shaped planar structures in the first half of the curved portion is different to the number of the stripe-shaped planar structures in the second half of the curved portion.

14. The backlight module of claim 12, wherein an included angle θr between an $r_{th}$ stripe-shaped planar structure counted from the central plane and the central plane satisfies the following equation:

$$\theta r = 90°*[n-(r_{th}-1)]/n$$

, where n denotes the number of the stripe-shaped planar structures between the central plane and the periphery of the outer surface of the curved portion.

15. The backlight module of claim 11, further comprising:
    a plurality of first micro structures on a first side surface of the top portion opposite the double-sided reflective sheet for guiding a light beam out of the plate-shaped transparent body through the first side surface; and
    a plurality of second micro structures on a second side surface of the bottom portion opposite the double-sided reflective sheet for guiding a light beam out of the plate-shaped transparent body through the second side surface.

16. The backlight module of claim 11, further comprising:
    a plurality of third micro structures on a third side surface of the top portion facing towards the double-sided reflective sheet for guiding a light beam out of the plate-shaped transparent body through the third side surface; and
    a plurality of fourth micro structures on a fourth side surface of the bottom portion facing towards the double-sided reflective sheet for guiding a light beam out of the plate-shaped transparent body through the fourth side surface.

17. The backlight module of claim 11, wherein the light source has a light-emitting surface and the light-emitting surface overlaps an end surface of the top portion or an end surface of the bottom portion.

18. The backlight module of claim 11, wherein part areas of the double-sided reflective sheet are coated with a light-absorbing material.

* * * * *